US012216245B2

(12) United States Patent
Yin

(10) Patent No.: US 12,216,245 B2
(45) Date of Patent: Feb. 4, 2025

(54) DISPLAY DEVICE HAVING HIGH IMAGE QUALITY

(71) Applicant: SHENZHEN HITEVISION TECHNOLOGY CO., LTD., Shenzhen (CN)

(72) Inventor: Qingsong Yin, Shenzhen (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/011,328

(22) PCT Filed: Sep. 20, 2022

(86) PCT No.: PCT/CN2022/119878
§ 371 (c)(1),
(2) Date: Dec. 19, 2022

(87) PCT Pub. No.: WO2023/274429
PCT Pub. Date: Jan. 5, 2023

(65) Prior Publication Data
US 2024/0118457 A1    Apr. 11, 2024

(30) Foreign Application Priority Data

May 24, 2022   (CN) .......................... 202221262300.3

(51) Int. Cl.
*G06F 1/18* (2006.01)
*G02B 1/14* (2015.01)

(52) U.S. Cl.
CPC ............... *G02B 1/14* (2015.01); *G06F 1/181* (2013.01)

(58) Field of Classification Search
CPC .. G06F 3/0488; G06F 3/04883; G06F 1/1601; G06F 1/1637; G06F 1/1626;
(Continued)

(56) References Cited

FOREIGN PATENT DOCUMENTS

CN      208367370 U  *  1/2019
CN      209591329 U     11/2019
(Continued)

OTHER PUBLICATIONS

International Search Report issued on Nov. 30, 2022, in corresponding International Application No. PCT/CN2022/119878, 6 pages.
(Continued)

*Primary Examiner* — James Wu
*Assistant Examiner* — Dakota M Talbert
(74) *Attorney, Agent, or Firm* — Maier & Maier, PLLC

(57) ABSTRACT

A display device includes a display panel, a middle frame, an annular retaining edge and a cover module. One side of the middle frame is provided with the annular retaining edge around a through hole, a receiving space communicating with the through hole is enclosed by the annular retaining edge and the middle frame, and the display panel is limited in the receiving space; and the cover module includes a protective cover covering a side, with the annular retaining edge, of the middle frame, a first buffer is placed between the protective cover and the display panel, and the protective cover fixes the display panel in the receiving space in a pressing manner through the first buffer. The protective cover fixes the display panel in a first groove in a pressing manner through the first buffer.

12 Claims, 4 Drawing Sheets

(58) Field of Classification Search
CPC ... G06F 2200/1612; G06F 2203/04105; G06F 2203/04103
See application file for complete search history.

(56) References Cited

FOREIGN PATENT DOCUMENTS

| | | | |
|---|---|---|---|
| CN | 212302156 U | | 1/2021 |
| CN | 212433536 U | * | 1/2021 |
| CN | 212460250 U | | 2/2021 |
| CN | 215932302 U | | 3/2022 |
| CN | 216351649 U | | 4/2022 |
| JP | 2011002708 A | | 1/2011 |
| WO | 2022089022 A1 | | 5/2022 |
| WO | 2023274429 A1 | | 1/2023 |

OTHER PUBLICATIONS

Extended Search Report issued on May 29, 2024, in corresponding European Application No. 22817054.4, 8 pages.

* cited by examiner

DISPLAY DEVICE HAVING HIGH IMAGE QUALITY

CROSS-REFERENCE TO RELATED APPLICATION

This application claims the priority of Chinese Patent Application No. 202221262300.3 filed on May 24, 2022, the entire contents of which are hereby incorporated by reference.

TECHNICAL FILED

The disclosed embodiments belong to the field of display devices, and particularly relates to a display device.

BACKGROUND

The display device, also called display, is a device which can output images or touch information. Display screen and cover lens are two important parts of the display device. In the prior art, the display screen is mounted in a middle frame of a module and pressed by a cover of the module.

However, in the prior art, the cover of the module between the display screen and the cover lens increases the distance between the display screen and the cover lens, which is usually more than 5 mm. When the display screen displays images, the display effect of the display screen will be affected due to the existence of an air layer with a thickness of more than 5 mm, and image quality is not ideal. Moreover, the excessive distance also leads to a large thickness of the whole display device.

SUMMARY

The disclosed embodiments provide a display device to solve the technical problem that, in the prior art, the distance between a display screen and a cover lens is too large.

In order to achieve the above purpose, the disclosed embodiments adopt the following technical scheme. A display device is provided, and includes:
  a display panel;
  a middle frame, the display panel being mounted on a side face of the middle frame;
  an annular retaining edge arranged on the side face, for mounting the display panel, of the middle frame, an inner peripheral wall of the annular retaining edge and an inner peripheral wall of the middle frame being spaced from each other, a receiving space being enclosed by the annular retaining edge and the middle frame, and the display panel being limited and mounted in the receiving space; and
  a cover module comprising a protective cover covering a side, with the annular retaining edge, of the middle frame, a first buffer being placed between the protective cover and the display panel, and the protective cover fixing the display panel in the receiving space in a pressing manner through the first buffer.

The display devices provided by the disclosed embodiments have the following beneficial effects: compared with the prior art, the display devices provided by the disclosed embodiments comprise a display panel, a middle frame and a cover module, an side of the middle frame is provided with an annular retaining edge, a receiving space is enclosed by the annular retaining edge and the middle frame, the display panel is limited and fixed in the receiving space, and the cover module comprises a protective cover which fixes the display panel in the receiving space in a pressing manner through a first buffer; in this way, the assembly process is simplified; because the display panel is directly fixed through the protective cover, separate design of parts for fixing the display panel is avoided, the distance between the display panel and the protective cover is greatly reduced, the display effect of the display device is improved, and image quality is optimized; besides, the weight and thickness of the display device are effectively reduced, and user experience is improved.

BRIEF DESCRIPTION OF THE DRAWINGS

In order to explain the technical scheme in the disclosed embodiments more clearly, the drawings used in the description of the embodiments or the prior art will be briefly introduced below. Obviously, the drawings in the following description only illustrate some embodiments, and for those of ordinary skill in the field, other drawings can be obtained according to these drawings without paying creative labor.

DETAILED DESCRIPTION OF THE EMBODIMENTS

Figure 1:
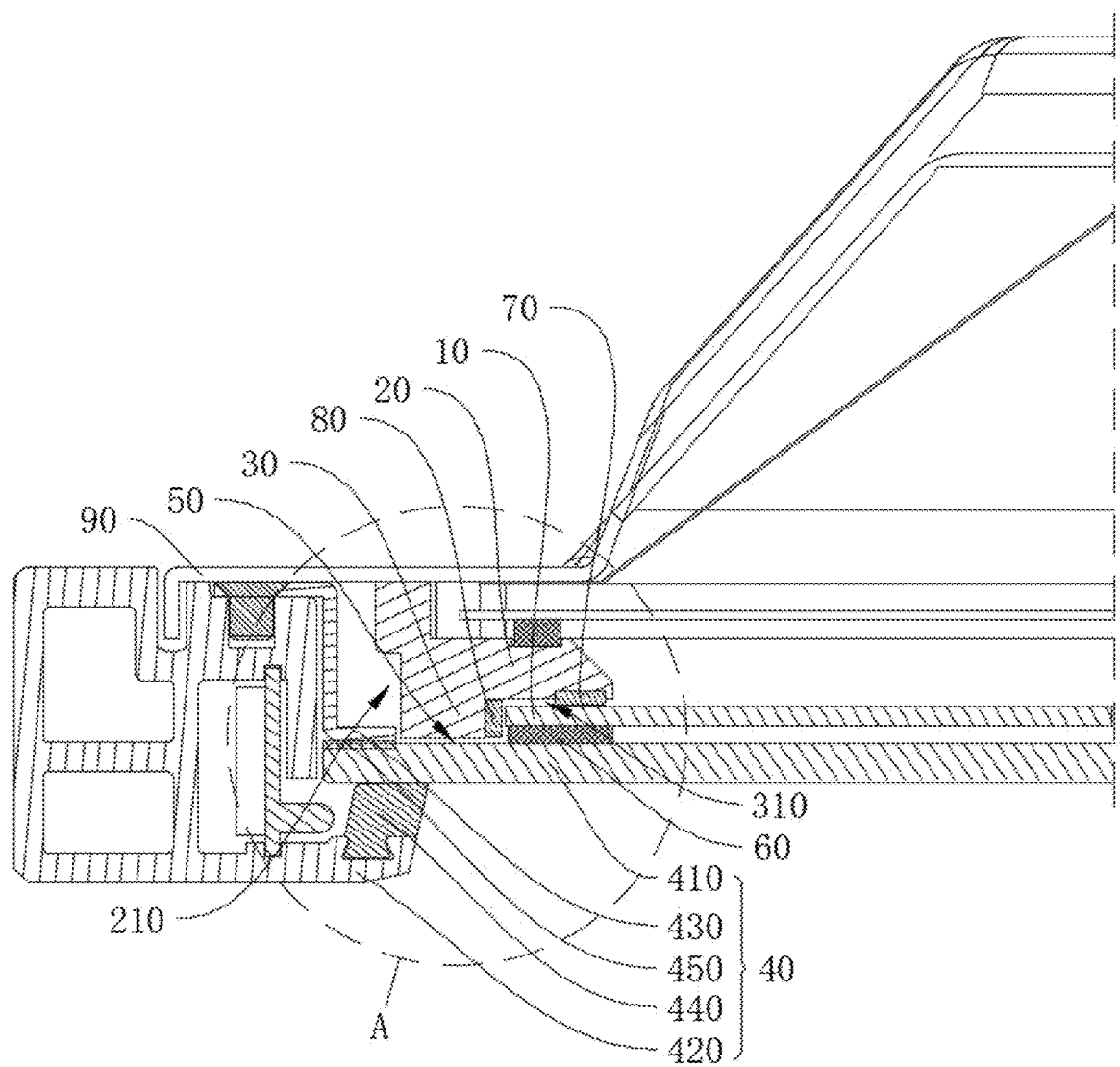
FIG. 1 is a cross-sectional diagram of a display device provided by a disclosed embodiment.

In order to make the technical problems to be solved, technical schemes and beneficial effects of this application clearer, the application will be further explained in detail below with reference to the drawings and embodiments. It should be understood that the specific embodiments described here are only used to explain the application, and are not used to limit the application.

It should be noted that when an element is described as being "fixed to" or "arranged on" another element, it may be directly or indirectly located on another element. When an element is considered to be "connected" to another element, it may be directly or indirectly connected to another element.

It should be noted that the orientation or position relationship indicated by the terms "length", "width", "upper", "lower", "front", "rear", "left", "right", "vertical", "horizontal", "top", "bottom", "inner" and "outer" are based on the orientation or position relationship shown in the drawings, only for convenience of describing the application and simplifying the description, and do not indicate or imply that the indicated device or element must have a specific orientation, or be constructed and operate in a specific orientation, and therefore cannot be understood as a limitation of the application.

Further, the terms "first" and "second" are only used for descriptive purposes, and cannot be understood as indicating or implying relative importance or implicitly indicating the number of indicated technical features. Therefore, the features defined with "first" and "second" may include one or more of the features explicitly or implicitly. In the description of this application, "multiple" means two or more, unless otherwise specifically defined.

As recorded in the background, referring to FIG. 1, in the prior art, a display panel is mounted in a middle frame and pressed by a cover of a module. However, in the prior art, the distance between a display screen and a cover lens is large, which is usually more than 5 mm. When the display screen displays images, the display effect of the display screen will be affected due to the existence of an air layer over 5 mm thick, and image quality is not ideal. Moreover, the excessive distance also leads to a large thickness of the whole display device.

Figure 2:
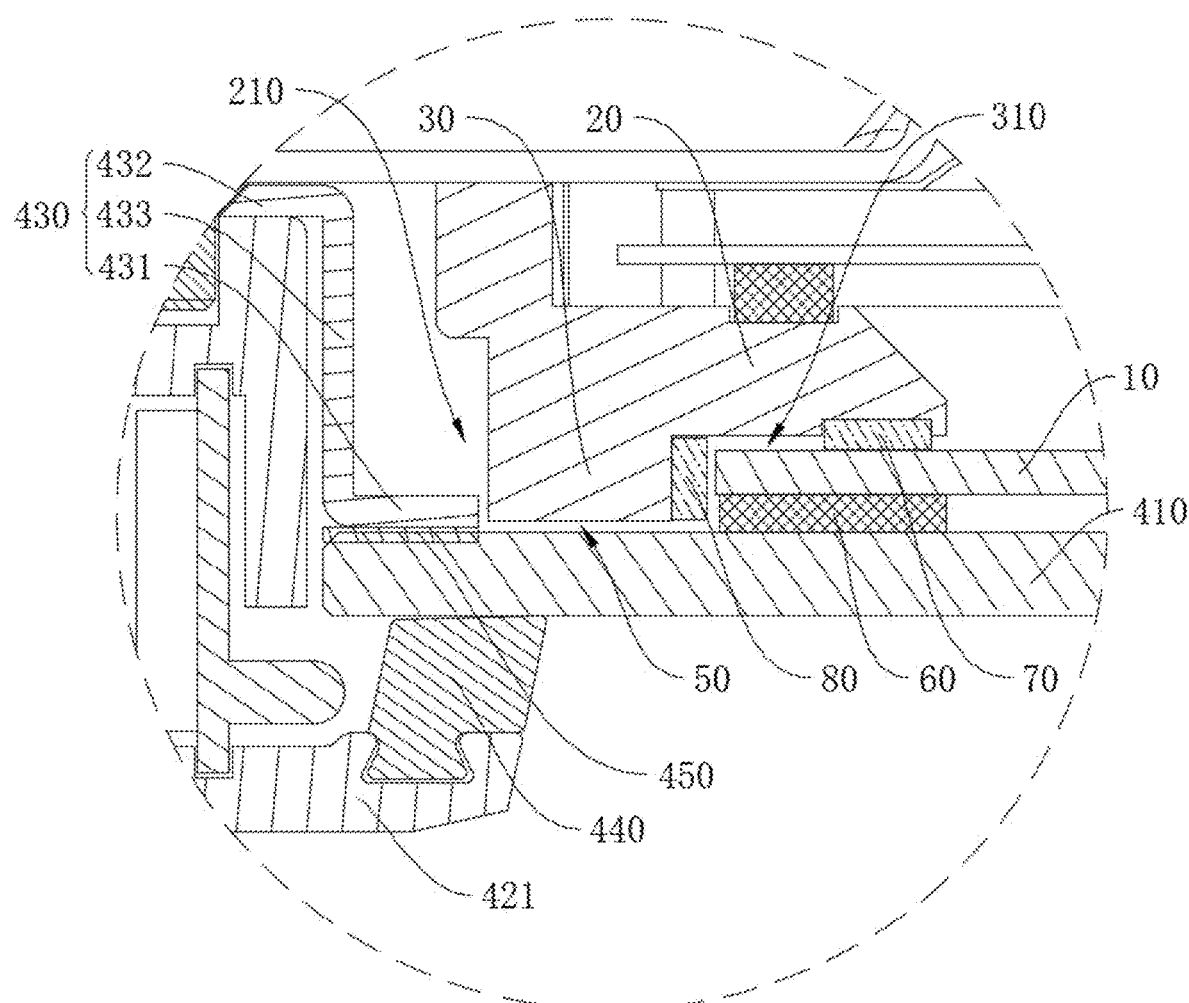
FIG. 2 is an enlarged view of region A in FIG. 1.

To solve the above problems, a disclosed embodiment provides a display device, referring to FIGS. 1 and 2, the display device comprises a display panel 10, a middle frame 20, an annular retaining edge 30 and a cover module 40. The display panel 10 is mounted on a side face of the middle frame 20. The annular retaining edge 30 is arranged on the side face, for mounting the display panel 10, of the middle frame 20, and an inner peripheral wall of the annular retaining edge 30 is spaced from an inner peripheral wall of the middle frame 20. A receiving space 310 is enclosed by the annular retaining edge 30 and the middle frame 20, and the display panel 10 is limited and mounted in the receiving space 310. The cover module 40 comprises a protective cover 410 which covers a side, with the annular retaining edge 30, of the middle frame 20, a first buffer 60 is placed between the protective cover 410 and the display panel 10, and the protective cover 410 fixes the display panel 10 in the receiving space 310 in a pressing manner through the first buffer 60.

Compared with the prior art, the display device provided by the disclosed embodiment comprises a display panel 10, a middle frame 20, an annular retaining edge 30 and a cover module 40, an side of the middle frame 20 is provided with the annular retaining edge 30, a receiving space 310 is enclosed by the annular retaining edge 30 and the middle frame 20, the display panel 10 is limited and fixed in the receiving space 310, and the cover module 40 comprises a protective cover 410 which fixes the display panel 10 in the receiving space 310 in a pressing manner through a first buffer 60; in this way, the assembly process is simplified; because the display panel 10 is directly fixed through the protective cover 410, separate design of parts for fixing the display panel 10 is avoided, the distance between the display panel 10 and the protective cover 410 is greatly reduced, the display effect of the display device is improved, and image quality is optimized; besides, the weight and thickness of the display device are effectively reduced, and user experience is improved.

In other embodiments, the first buffer 60 between the protective cover 410 and the display panel 10 becomes thinner when subjected to excessive pressure. If a gap 50 between the protective cover 410 and the annular retaining edge 30 is too large, the display panel 10 may be forced out of the receiving space 310 and enter the gap 50 between the protective cover 410 and the annular retaining edge 30, and then the display panel 10 may be crushed by the protective cover 410 and the annular retaining edge 30.

In one embodiment, referring to FIGS. 1 and 2, the size of the gap 50 between the protective cover 410 and the annular retaining edge 30 is smaller than the thickness of the display panel 10.

It should be noted that, on one hand, the gap 50 is used to prevent rigid contact between the annular retaining edge 30 and the protective cover 410, and on the other hand, because the area of the middle frame 20, the annular retaining edge 30 and the protective cover 410 is large, slight deformation may occur, so the gap 50 can also provide a deformation space for the middle frame 20, the annular retaining edge 30 or the protective cover 410.

By making the size of the gap 50 between the protective cover 410 and the annular retaining edge 30 smaller than the thickness of the display panel 10, the display panel 10 cannot leave the receiving space 310 to enter the gap 50 between the protective cover 410 and the annular retaining edge 30 in any case, so that the display panel 10 is well protected. Besides, the size of the gap 50 between the protective cover 410 and the annular retaining edge 30 being smaller than the thickness of the display panel 10 also makes the display panel 10 closer to the protective cover 410, thereby reducing the thickness of an air layer, so that the display effect of the display device can be improved and image quality can be optimized.

Specifically, assuming that the thickness of the display panel 10 is 1.5 mm, the size of the gap 50 between the protective cover 410 and the annular retaining edge 30 is smaller than 1.5 mm.

Specifically, referring to FIGS. 1 and 2, an air layer exists between the display panel 10 and the protective cover 410, and the thickness of the first buffer 60 in the natural state is larger than that of the air layer after the protective cover 410 is assembled, that is, after the protective cover 410 is assembled, the first buffer 60 is pressed by the display panel 10 and the protective cover 410, so that the first buffer 60 can play a sealing role to prevent external dust or water vapor from entering the air layer.

In one embodiment, referring to FIGS. 1 and 2, the first buffer 60 is buffer foam, and the buffer foam is arranged along a circumferential edge of the display panel 10.

In this way, after the cover module 40 and the middle frame 20 are assembled, the buffer foam is pressed by the display panel 10 and the protective cover 410 in the thickness direction, which can realize a better sealing effect and better prevent dust or water vapor from entering the air layer. Specifically, the buffer foam has the advantages of being elastic, low in weight, capable of realizing quick pressure-sensitive fixation, convenient to use, flexible, ultra-thin, reliable in performance and so on.

Specifically, it is assumed that the air layer is 0.8 mm thick, and the thickness of the buffer foam needs to be greater than 0.8 mm to ensure that the buffer foam can be pressed by the display panel 10 and the protective cover 410 in the thickness direction after the cover module 40 and the middle frame 20 are assembled.

It can be understood that the above-mentioned buffer foam can be bonded between the protective cover 410 and the display panel 10, or can be fixed between the protective cover 410 and the display panel 10 in a pressed mode. The fixing method of the buffer foam between the protective cover 410 and the display panel 10 can be determined as needed, and is not limited here.

In one embodiment, referring to FIGS. 1 and 2, a second buffer 70 is arranged between the middle frame 20 and the display panel 10, and a third buffer 80 is arranged between the annular retaining edge 30 and the display panel 10.

By arranging the second buffer 70 between the middle frame 20 and the display panel 10, rigid contact between the display panel 10 and the middle frame can be prevented, such that the display panel 10 is protected against damage.

Further, a side face, close to the display panel 10, of the middle frame 20 is provided with a groove for receiving the second buffer 70, and part of the second buffer 70 is locked in the groove to prevent the second buffer 70 from moving laterally between the middle frame 20 and the display panel 10 to be separated from the middle frame 20.

By arranging the third buffer 80 between the annular retaining edge 30 and the display panel 10, rigid contact between the display panel 10 and the annular retaining edge 30 can be prevented, such that the display panel 10 is protected against damage.

In other embodiments, the second buffer 70 and the third buffer 80 are both soft rubber or silicone strips to achieve a better buffering effect.

In another embodiment, the middle frame 20 and the annular retaining edge 30 are integrated with each other.

By integrating the middle frame 20 and the annular retaining edge 30, the overall structural strength can be strengthened, and the mounting of the display device can be simplified.

Of course, the middle frame 20 may also be a combined structure formed by splicing. The specific structure of the middle frame 20 is determined as needed, and is not limited here.

In some embodiments, referring to FIGS. 1 and 2, the cover module 40 further comprises a surface frame 420 and a cover press bar 430, the surface frame 420 surrounds and is fixed on an outer side of the middle frame 20, a stopper 421 is arranged at an opening edge, close to the display panel 10, of the surface frame 420, the cover press bar 430 is fixed to an inner peripheral wall of the surface frame 420, and cooperates with the stopper 421 to fix the protective cover 410 at an opening of the surface frame 420.

In this way, the protective cover 410 is clamped and fixed by the surface frame 420 and the cover press bar 430, and the surface frame 420, the protective cover 410 and the cover press bar 430 are combined to form the cover module 40, so that workers can assemble the cover module 40 first, and then press the display panel 10 into the middle frame 20 through the whole cover module 40, thus improving the assembly efficiency of the display device.

In a specific embodiment, referring to FIGS. 1 and 2, the display device further comprises a backplane 90, and the middle frame 20 and the cover module 40 are fixed on a same side face of the backplane 90.

Specifically, the surface frame 420 of the cover module 40 and the middle frame 20 are fixed on the same side face of the backplane 90, so that the surface frame 420 surrounds and is fixed on the outer side of the middle frame 20.

Further, the display device further comprises an optical film.

During assembly, workers put the optical film in the backplane 90 with a cavity facing upwards, press the optical film in the cavity of the backplane 90 with the middle frame 20, and then fix the middle frame 20 on the backplane 90, thus completing the assembly of the middle frame 20 and the backplane 90; the display panel 10 is embedded into the receiving space enclosed by the middle frame 20 and the annular retaining edge 30 while the second buffer 70 is locked in the groove of the middle frame 20 and the third buffer 80 is attached to an inner side of the annular retaining edge 30, thus completing the assembly of the display panel 10 and the middle frame 20; and the first buffer 60 is placed on an edge of the display panel 10, then the display panel 10 and the first buffer 60 are pressed inside by the whole cover module 40, and then the cover module 40 is fixedly connected with the backplane 90, thus completing the assembly of the display device.

Further, buffer foam is also arranged between the middle frame 20 and the optical film to prevent the middle frame 20 from scratching the optical film.

In another specific embodiment, referring to FIGS. 1 and 2, a strip light filter 440 is arranged between the stopper 421 and the protective cover 410, and a fourth buffer 450 is arranged between the cover press bar 430 and the protective cover 410.

It should be noted here that the protective cover 410 of the display device generally is glass.

In this way, both sides of the glass are not in contact with the stopper 421 and the cover press bar 430, so that the glass can be prevented from being scratched by the stopper 421 and the cover press bar 430.

Of course, in other embodiments, the cover module 40 further comprises an infrared plate. In this case, the surface frame 420 is formed by splicing four strip-shaped structures, the inside of the strip-shaped structure is provided with a locking groove in the length direction, and a surface, close to the protective cover 410, of the stopper 421 is provided with a dovetail groove or a T-shaped groove in the length direction; the infrared plate is positioned through the locking groove and inserted into the strip-shaped structure from either end of the strip-shaped structure, and the strip light filter 440 is inserted from either end of the dovetail groove or the T-shaped groove; and the four strip-shaped structures are assembled with the infrared plate and the strip light filter 440 separately. And then assembled into an integral surface frame 420.

In another specific embodiment, referring to FIGS. 1 and 2, the cover press bar 430 comprises a pressing plate 431, a mounting plate 432 and a connecting plate 433, the pressing plate 431 and the mounting plate 432 are respectively connected to two ends of the connecting plate 433 and respectively arranged on two sides of the connecting plate 433, and the mounting plate 432 is fixed on an end face, facing away from the protective cover 410, of the surface frame 420.

Specifically, the mounting plate 432 of the cover press bar 430 is locked on an end face, facing away from the protective cover 410, of the surface frame 420 by screws, so that the cover press bar 430 can cooperate with the stopper 421 of the surface frame 420 to stably clamp the protective cover 410.

Of course, in other embodiments, the cover press bar 430 may be L-shaped, with a side attached to an inner side face of the surface frame 420 and locked by a screw, and another side cooperating with the stopper 421 of the surface frame 420 to clamp the protective cover 410. The specific structural design of the cover press bar 430 may be determined as needed, and is not limited here.

It should be noted here that the cover press bar 430 may be designed as a whole circle or a plurality of segment structures distributed along an inner circumferential surface of the surface frame 420. The specific structure of the cover press bar 430 may be determined as needed, and is not limited here.

In a more specific embodiment, referring to FIGS. 1 and 2, a receding notch 210 corresponding to the cover press bar 430 is concavely formed in an outer edge of the end face, provided at the annular retaining edge 30, of the middle frame 20, a gap exists between an inner peripheral wall of the surface frame 420 and a wall surface of the receding notch 210, and the pressing plate 431 is positioned in the gap.

In this way, the pressing plate 431 will not overlap the annular retaining edge 30 and the protective cover 410, but will be located at the outer side of the annular retaining edge 30, further reducing the thickness of the display device.

Further, if the cover press bar 430 is L-shaped, the side, attached to the inner side face of the surface frame 420, of the cover press bar 430 and the screw for locking can be placed in the gap, so as to reduce the thickness of the display device.

Figure 3:
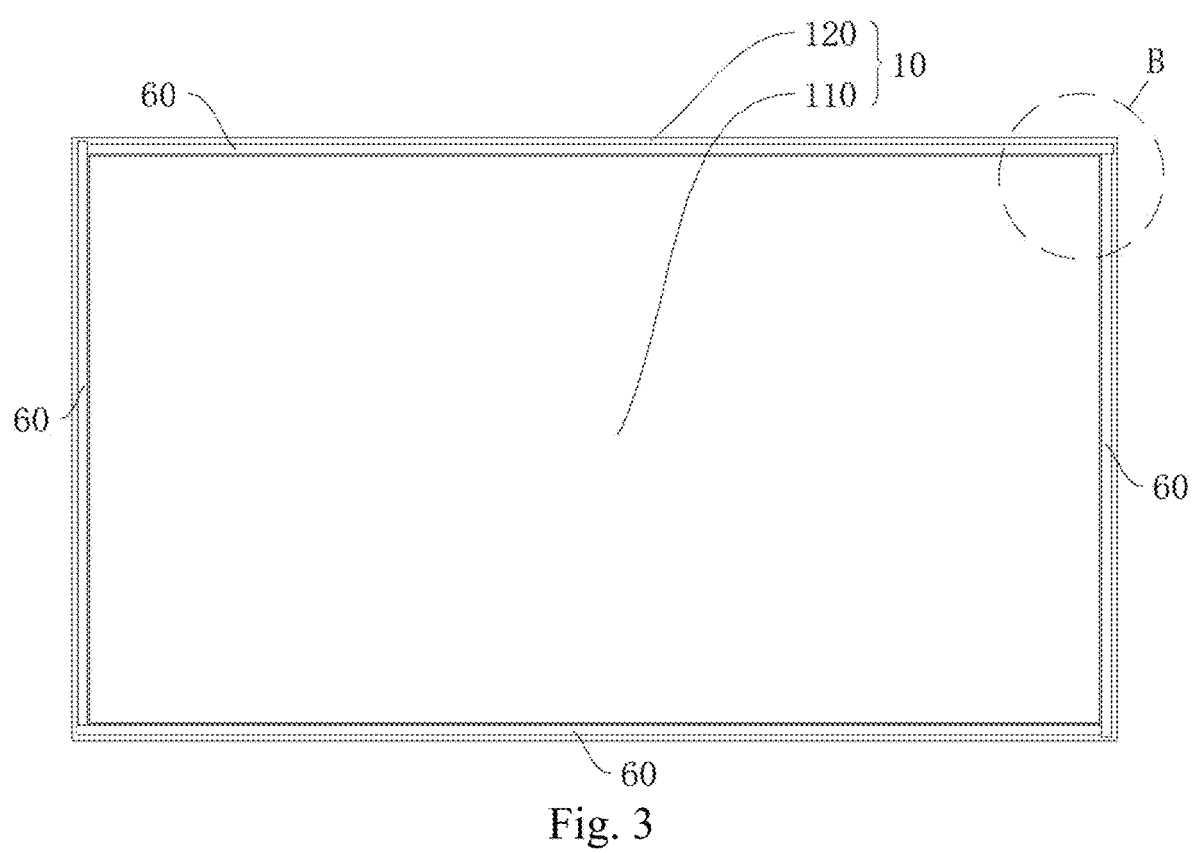
FIG. 3 is a diagram of the positional relationship between a display panel and a first buffer used in a disclosed embodiment.
Figure 4:
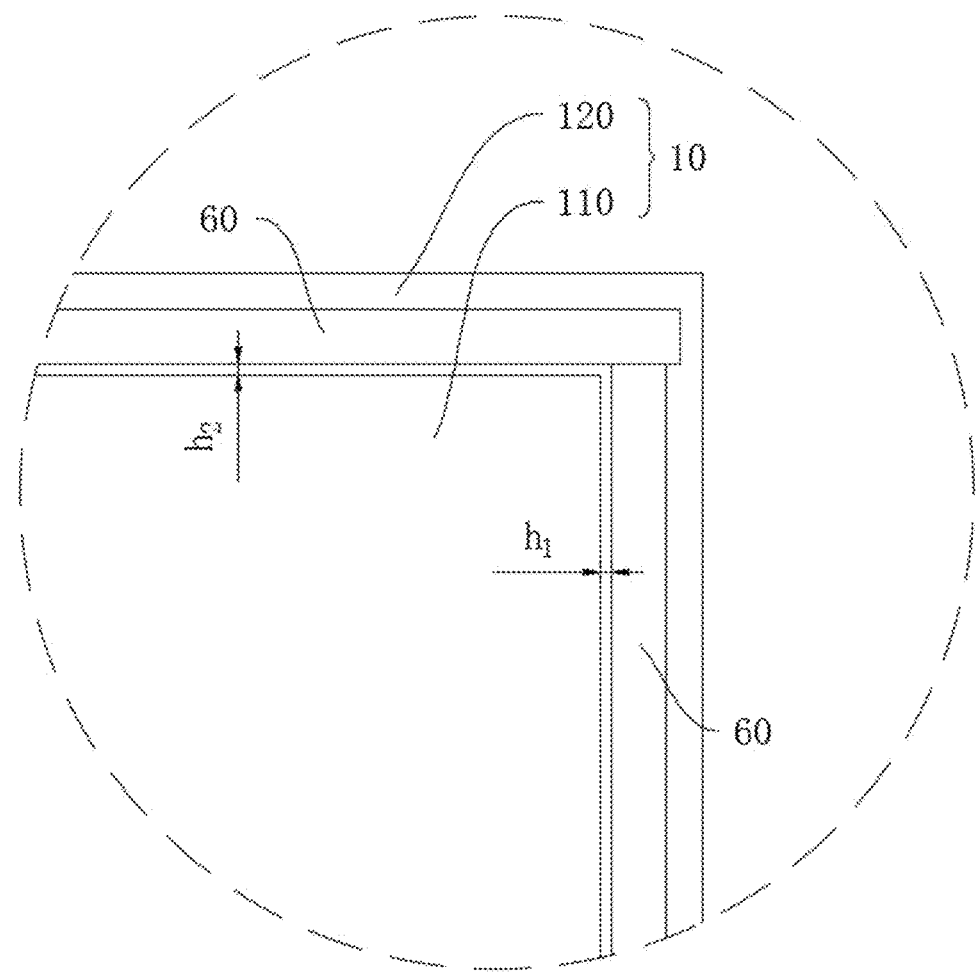
FIG. 4 is an enlarged view of region B in FIG. 3.

In other embodiments, referring to FIGS. 3 and 4, the display panel 10 comprises a display area 110 in the middle and a border area 120 at the outer edges, and the buffer foam is of a split structure (usually two long and two short) and attached to the border area 120.

Specifically, the distance between the buffer foam in the border area 120 with short sides and the display area 110 is $h_1$, and the distance between the buffer foam in the border area 120 with long sides and the display area 110 is $h_2$, $h_1$ and $h_2$ are both greater than 1.5 mm, such that the display area 110 is prevented from being abraded by the buffer foam.

Specifically, the joints of the four pieces of buffer foam are tight without gaps, and the width of the buffer foam ensures that outer edges do not exceed the outer edges of the display screen after assembly.

The above are only embodiments of the application, and are not intended to limit the application. Any modifications, equivalent substitutions and improvements made within the spirit and principles of the application should be included in the scope of protection of the application.

What is claimed is:

1. A display device, comprising:
   a display panel;
   a middle frame, the display panel mounted on a side face of the middle frame;
   an annular retaining edge, arranged on the side face, for mounting the display panel of the middle frame, an inner peripheral wall of the annular retaining edge and an inner peripheral wall of the middle frame spaced from each other, a receiving space enclosed by the annular retaining edge and the middle frame, and the display panel limited and mounted in the receiving space; and
   a cover module comprising a protective cover covering a side, with the annular retaining edge of the middle frame, a first buffer placed between the protective cover and the display panel, and the protective cover fixing the display panel in the receiving space in a pressing manner through the first buffer;
   wherein there is no gap between the display panel and the first buffer;
   wherein the protective cover and the annular retaining edge are not contact directly, there is a gap between the protective cover and the annular retaining edge, and a size of the gap is smaller than a thickness of the display panel;
   wherein the first buffer is buffer foam arranged along a circumferential edge of the display panel.

2. The display device of claim 1, wherein a second buffer is arranged between the middle frame and the display panel, and a third buffer is arranged between the annular retaining edge and the display panel.

3. The display device of claim 1, wherein the middle frame and the annular retaining edge are integrated with each other.

4. The display device of claim 1, wherein the cover module further comprises a surface frame and a cover press bar, the surface frame surrounds and is fixed on an outer side of the middle frame, a stopper is arranged at an opening edge, close to the display panel, of the surface frame, and the cover press bar is fixed to an inner peripheral wall of the surface frame, and cooperates with the stopper to fix the protective cover at an opening of the surface frame.

5. The display device of claim 4, further comprising a backplane, and the middle frame and the cover module are fixed on a same side face of the backplane.

6. The display device of claim 4, wherein a strip light filter is arranged between the stopper and the protective cover, and a fourth buffer is arranged between the cover press bar and the protective cover.

7. The display device of claim 4, wherein the cover press bar comprises a pressing plate, a mounting plate and a connecting plate, the pressing plate and the mounting plate are connected to two ends of the connecting plate respectively, and arranged on two sides of the connecting plate respectively, and the mounting plate is fixed on an end face, facing away from the protective cover, of the surface frame.

8. The display device of claim 7, wherein on an end face, provided at the annular retaining edge, of the middle frame, a receding notch corresponding to the cover press bar is formed in an outer edge of the end face in a concave manner, a gap exists between the inner peripheral wall of the surface frame and a wall surface of the receding notch, and the pressing plate is positioned in the gap.

9. The display device of claim 2, wherein the cover module further comprises a surface frame and a cover press bar, the surface frame surrounds and is fixed on an outer side of the middle frame, a stopper is arranged at an opening edge, close to the display panel, of the surface frame, and the cover press bar is fixed to an inner peripheral wall of the surface frame, and cooperates with the stopper to fix the protective cover at an opening of the surface frame.

10. The display device of claim 9, further comprising a backplane, and the middle frame and the cover module fixed on a same side face of the backplane.

11. The display device of claim 9, wherein a strip light filter is arranged between the stopper and the protective cover, and a fourth buffer is arranged between the cover press bar and the protective cover.

12. The display device of claim 3, wherein the cover module further comprises a surface frame and a cover press bar, the surface frame surrounds and is fixed on an outer side of the middle frame, a stopper is arranged at an opening edge, close to the display panel, of the surface frame, and the cover press bar is fixed to an inner peripheral wall of the surface frame, and cooperates with the stopper to fix the protective cover at an opening of the surface frame.

* * * * *